United States Patent [19]
Zarth

[11] 3,809,979
[45] May 7, 1974

[54] MOTOR BRAKE CIRCUIT
[75] Inventor: Karl-Heinz Zarth, Remscheid, Germany
[73] Assignee: "Rhewum" Rheinische Werkzeug-und Maschinenfabrik GmbH, Remscheid, Germany
[22] Filed: Dec. 11, 1972
[21] Appl. No.: 313,669

[30] Foreign Application Priority Data
Dec. 30, 1971 Germany............................ 2165471

[52] U.S. Cl. ............................................. 318/212
[51] Int. Cl. ............................................. H02p 3/20
[58] Field of Search ........................... 318/209–212

[56] References Cited
UNITED STATES PATENTS
3,708,734  1/1973  Rowe................................. 318/212
3,514,682  5/1970  Corey................................. 318/211

Primary Examiner—Gene Z. Rubinson
Attorney, Agent, or Firm—Spencer & Kaye

[57] ABSTRACT

In a direct current brake circuit for braking a three-phase, short-circuit rotor motor, a thyristor and diode are connected between the motor and its three phase supply, via controllable switches, overvoltage protection components are connected to the thyristor and the diode, and protective circuitry is connected to cause the thyristor and diode to be connected to the motor stator and to the motor supply, and the braking voltage to be applied to the motor stator, under no load conditions.

6 Claims, 2 Drawing Figures

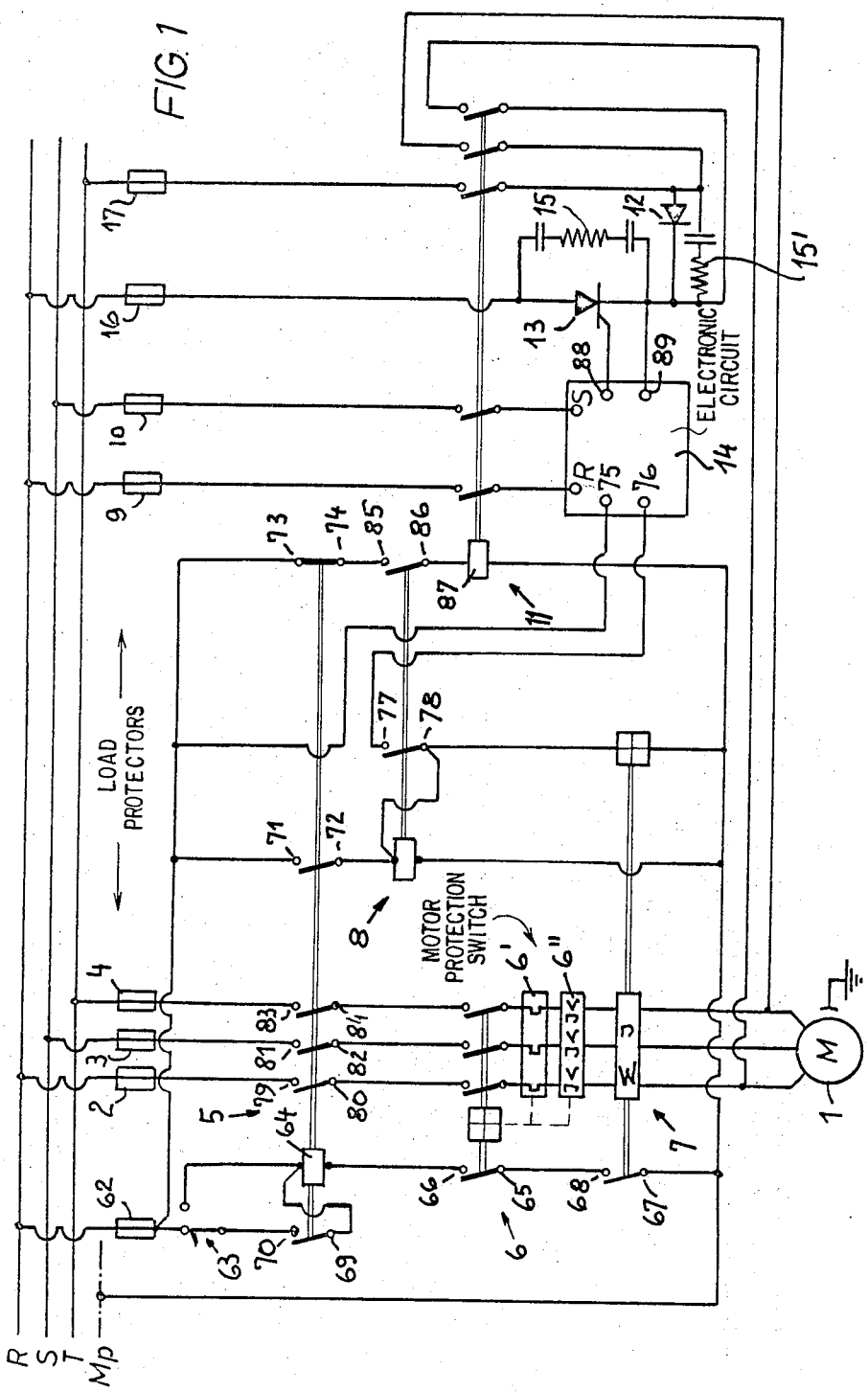

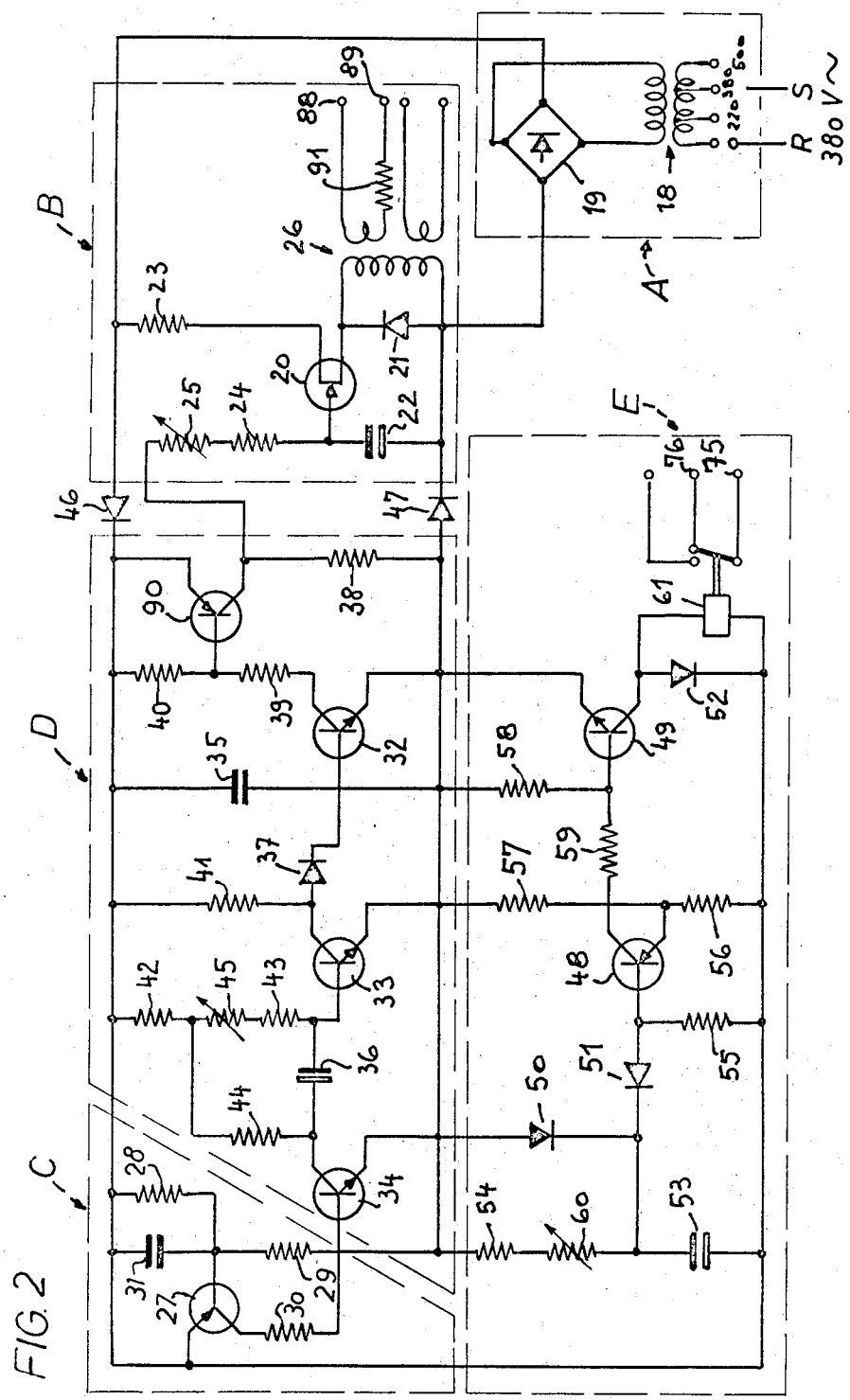

MOTOR BRAKE CIRCUIT

BACKGROUND OF THE INVENTION

The present invention relates to a direct current brake circuit particularly for three-phase current short-circuit rotor motors where the stator of the motor is connected to a pulsating direct voltage while the three-phase current supply mains is switched off.

One arrangement previously used to stop the armature of a three-phase short circuit rotor motor as quickly as possible after the three-phase current has been switched off, is a counter-current braking circuit with a brake monitor in which two phase connections are interchanged by a suitable switch, so that the direction of the rotary stator field is reversed to produce a braking moment. In this case, however, the switch-off of the reversed stator field must occur at the latest when the rate of armature rotation passes through zero because otherwise the motor would start up in the opposite direction of rotation. In order to prevent this, the brake monitor is switched off.

There exists the drawback, however, that the braking current will reach a value 16 to 18 times that of the rated current. Moreover, the braking time depends on the motor load so that when the braking time is selected too short for the then-existing load, the motor will continue to run after the braking current has been stopped, or when the braking time is selected too long, the motor will nevertheless start up in the opposite direction of rotation before termination of braking.

Moreover, a direct current brake for a three-phase current motor is known which feeds the stator with a single phase direct current via a relay, while the three-phase current mains is simultaneously switched off via the stator relays.

Here, too, the braking current reaches a value of 16 to 18 times the rated current. Moreover, when a direct current brake is used, the motor can only be connected to mains having a voltage of up to 3 × 220V or 3 × 380V with a neutral fourth wire. This is so because the brake voltage should not exceed 220V, if possible, since the braking current increases with the brake voltage. Moreover, expensive direct current relays are required in this case to switch the braking current.

SUMMARY OF THE INVENTION

It is an object of the present invention to avoid the need for a high braking current in a direct current brake circuit of the type described above.

This object and others according to the present invention are achieved by the provision of a network including diode and a controllable thyristor in a protective circuit to feed the motor stator with direct current, the network being connectable to the three-phase current network.

Such a network permits the realization of a braking voltage which is substantially reduced with respect to the mains voltage and thus there results from this reduced braking voltage a reduced braking current. It has been found that a braking current of less than five times the rated current is sufficient to immediately stop the motor after disconnection of the three-phase current mains.

It would be possible to arrive at a lower braking current than previously attainable by the provision of a control transformer, but such a transformer would be substantially more expensive than a circuit according to the present invention. Moreover, if a control transformer were used to reduce the braking voltage and thus the braking current, the space required for the transformer would be more than 40 times that required for a circuit according to the present invention. Additionally, such a high-output transformer also requires provisions for dissipation of the heat loss.

In an advantageous embodiment of the invention, a load-free connection of the direct voltage to the stator of the motor, the connection of the network including a diode and a thyristor to the three-phase current mains and the connection of this network to the motor stator are effected by timer switches acting with either an advance or a delay with respect to the thyristor actuation. Thus the very expensive direct current switches previously required are no longer necessary since in embodiments of the invention only the thyristor switches under load.

In order to be able to adapt the direct current brake circuit to the particular motor load, according to an advantageous feature of the invention, the duration of the direct current flow is limited or selectively varied by a timer switch.

A preferred, and practically maintenance-free, embodiment of the present invention includes an electronic control device which influences the network composed of a diode and a thyristor in protective connection, the device including a supply portion composed of a transformer connectable to the three-phase current mains and a subsequently connected rectifier bridge. A thyristor setting member including a pulse generator with a unijunction transistor and a potentiometer is connected to the supply portion and these circuit elements are connected, via a transformer, to the network composed of the diode and the thyristor.

Preferred embodiments further include, in addition to the structure described above: an electronic switch-on delay member with a constant switch-on delay and having a transistor, a capacitor and three ohmic resistors, the member being connected ahead of the thyristor setting member; an electronic switch-off delay member which is influenced by the switch-on delay member and which acts on the thyristor setting member, its delay time being preselectable; and finally an electronic switch-off delay which acts on the switch for separating the three-phase current mains or the motor stator, respectively, from the network composed of the diode and the thyristor, which electronic delay circuit acts ahead of the thyristor setting member when the braking process is initiated and acts after the thyristor setting member when the braking process is completed.

BRIEF DESCRIPTION OF THE DRAWING

FIG. 1 is a circuit diagram of a direct current brake according to the invention.

FIG. 2 is a circuit diagram of the control device for the circuit of FIG. 1.

DESCRIPTION OF THE PREFERRED EMBODIMENTS

In the device shown in FIG. 1, a three-phase motor 1 is connected, via three load protectors 2, 3 and 4, a switching relay 5, a motor protection switch 6 with thermal and magnetic short circuit triggers, and a phase monitor 7, to a three-phase current mains R, S, T.

In order to permit selective connection of a pulsating direct current voltage to the motor 1, there is provided an auxiliary relay 8 for locking, two load protectors 9 and 10, a switch 11, a diode 12, a thyristor 13 and an electronic control 14, the diode 12 and the thyristor 13 being protected against excess voltages by associated RC circuits 15 and 15'.

The electronic circuit 14 is shown in detail in FIG. 2 and includes a supply portion A containing a transformer 18 which can be connected to the phases R and S of the three-phase current mains via the load protectors 9 and 10 and contacts of switch 11, the transformer secondary providing an output of 24V, 50 Hz. A rectifier bridge 19 is connected to the secondary of transformer 18.

A thyristor setting member B is connected to the supply portion A and includes a unijunction transistor 20, a diode 21, a capacitor 22, fixed ohmic resistors 23 and 24 and a variable resistor 25. This thyristor setting member B is connected in a protective circuit to the network including diode 12 and thyristor 13 via a transformer 26.

A switch-on delay member C, a switch-off delay member D and a switch-off delay member E are connected to the thyristor setting member B.

The switch-on delay member C includes a network composed of a transistor 27, fixed resistors 28, 29 and 30 and a capacitor 31.

The switch-off delay member D is composed of a network of three transistors 32, 33 and 34, two capacitors 35 and 36, a diode 37, seven fixed resistors 38, 39, 40, 41, 42, 43, and 44 and a variable resistor 45.

Between the thyristor setting member B and the switch-off delay member D two diodes 46 and 47 are provided.

The switch-off delay member E includes two transistors 48 and 49, three diodes 50, 51 and 52, a capacitor 53, six fixed resistors 54, 55, 56, 57, 58 and 59, a variable resistor 60, and a relay 61.

If a voltage is to be applied to motor 1, the control switch 63, which is connected to mains phase R via a load protector, or circuit breaker, 62 is actuated. Thus coil 64 of the switching relay 5 receives the control voltage of phase R and receives the counter potential Mp via the manually connected auxiliary contacts 65, 66 of the motor protection switch 6 and the auxiliary contacts 67, 68 of the phase monitor 7 so that the switching relay 5 closes and then is held in the closed position via its auxiliary contact 69, 70.

In parallel with the switching relay 5, the auxiliary relay 8 is excited via auxiliary contacts 71, 72 and closes. At the same time the latching contact 73, 74 of switching relay 5 opens. A holding voltage is fed to auxiliary relay 8 via contacts 75, 76 of the electronic control 14 and via its own auxiliary contacts 77, 78.

If motor 1 is to be braked, the control switch 63 is pivoted to the left. Thus the holding voltage for the relay coil 64 of switching relay 5 is interrupted, the previously closed contacts 69, 70; 71, 72; 79, 80; 81, 82; 83, 84 open while contact 73, 74 is closed.

Coil 87 of switch 11, which is constructed as a relay, is excited via contact 73, 74 of the switching relay 5 and the contacts 85, 86 of the auxiliary relay 8 and almost simultaneously all contacts of switch 11 are closed and thus the transformer 18 of the control 14 is connected to the mains voltage. A pulsating direct voltage of 24V, 50Hz flows from plug to minus from bridge 19.

This has the result of rendering transistor 27 of switch-on delay member C conductive after a fixed delay period of about 0.5 second and triggers transistor 34 of the switch-off delay member D so that the blocking function of transistor 33 is eliminated to permit thyristor setting member B to trigger thyristor 13 thus applying direct voltage to motor 1 and braking it. This results in a reduction to a greater or lesser extent in the conduction period of the thyristor compared to the maximum conduction period constituted by each half cycle of the mains voltage. The amount of reduction is controlled by setting the variable resistor 25 to effect a voltage regulation corresponding to the desired phase position.

At the same time capacitor 36 begins discharging via the variable resistor 45 which can be set to select the discharge time. Once the capacitor 36 has discharged, transistor 33 becomes conductive and blocks the positive polarity control voltage for transistor 32 and thus also the turn-on phase for thyristor setting member B so that thyristor 13 is blocked and direct voltage is no longer applied to the motor 1.

When the supply portion A is connected to the mains, direct voltage is also applied to the switch-off delay member E and thus relay 61 is actuated via transistors 48 and 49 whose switching times are preselectable by adjustment of the variable resistor 60. This interrupts the holding voltage of switch 11 acting as a relay so that the switch opens.

The delay period of the switch-off delay member E should here be selected to be 1 to 2 seconds longer than the delay period of the switch-off delay member D so that switch 11 always switches without load.

After opening of switch 11, input voltage is removed from transformer 18 and all electrical components return to their starting conditions.

The connecting contacts 88, 89 in FIG. 1 are identical with the identically numbered contacts shown in FIG. 2.

To amplify the control voltage of the switch-off delay member D, a transistor 90 is connected between the transistor 32 and the unijunction transistor 20.

In order to be able to use a commercially available, standard output transformer 26, a resistor 91 is provided in the output circuit of the transformer to adapt it to the existing control voltage.

It will be understood that the above description of the present invention is susceptible to various modifications, changes and adaptations, and the same are intended to be comprehended within the meaning and range of equivalents of the appended claims.

I claim:

1. In a direct current brake circuit for a three-phase current short-circuit rotor motor, which circuit brakes the motor by applying a pulsating d.c. voltage to the stator of the motor while the three-phase current supply to the motor is switched off, the improvement wherein said circuit includes: means for deriving a pulsating d.c. voltage from an a.c. voltage; and switch means selectively connecting said deriving means between the motor stator and the three-phase current supply for the motor for supplying such pulsating voltage to the motor; said deriving means comprising a diode and a controllable thyristor connected to said diode and connectable by said switch means in series between one phase of the three phase supply and the motor stator, and a protective circuit connected to each of said diode and thyristor, said protective circuit constituting means for protecting said diode and thyristor against excess voltages.

2. A circuit as defined in claim 1 further comprising timer means which switch on before conduction through said thyristor commences and which switch off ofter conduction through said thyristor terminates and connected to said switch means for establishing a load-free connection of the direct braking voltage to the stator of the motor, and of said deriving means to the three-phase current supply, and for connecting said deriving means to the motor stator.

3. A circuit as defined in claim 2 further comprising a selectively variable timer switch connected for controlling the duration of the direct current supply to the motor.

4. A circuit as defined in claim 3 further including an electronic control for influencing said deriving means and comprising: supply means containing a transformer arranged to be connected to the three-phase current supply and rectifier bridge connected to the output of said transformer; and a thyristor setting member containing a pulse generator composed of a unijunction transistor and a potentiometer connected between said supply means and said thyristor.

5. A circuit as defined in claim 4 further comprising an electronic switch-on delay member connected to said thyristor setting member, said electronic switch-on delay member having a constant switch-on delay period and including a transistor, a capacitor, three ohmic resistors, and means interconnecting them; a first electronic switch-off delay member having an adjustable delay period and connected to be influenced by said switch-on delay member and to act on said thyristor setting member; and a second electronic switch-off delay member connected to interrupt the connection between said deriving means and at least one of the three-phase current supply and the motor stator, said second electronic switch-off delay member being set to act before said thyristor setting member when the braking process is being initiated and to act after said thyristor setting member when the braking process is completed.

6. A circuit as defined in claim 1 wherein said protective circuit comprises two series RC circuits each connected in parallel with a respective one of said diode and thyristor.

* * * * *